(12) United States Patent
James et al.

(10) Patent No.: US 7,579,596 B2
(45) Date of Patent: Aug. 25, 2009

(54) MILLIMETRE AND SUB-MILLIMETRE IMAGING DEVICE

(75) Inventors: Jonathan James, Oxfordshire (GB); Christopher Mann, St Mawgan (GB)

(73) Assignee: The Science and Technology Facilities Council, Oxfordshire (GB)

(*) Notice: Subject to any disclaimer, the term of this patent is extended or adjusted under 35 U.S.C. 154(b) by 260 days.

(21) Appl. No.: 10/571,901

(22) PCT Filed: Sep. 15, 2004

(86) PCT No.: PCT/GB2004/003930
§ 371 (c)(1),
(2), (4) Date: Mar. 14, 2006

(87) PCT Pub. No.: WO2005/026833
PCT Pub. Date: Mar. 24, 2005

(65) Prior Publication Data
US 2007/0029483 A1    Feb. 8, 2007

(30) Foreign Application Priority Data
Sep. 15, 2003 (GB) ................... 0321628.0
Sep. 30, 2003 (GB) ................... 0322847.5

(51) Int. Cl.
*G01J 5/02* (2006.01)
(52) U.S. Cl. .............. 250/341.1; 343/753; 343/755
(58) Field of Classification Search ........... 250/341.1; 343/725, 753, 755
See application file for complete search history.

(56) References Cited
U.S. PATENT DOCUMENTS
3,911,435 A    10/1975    Mardon et al.
(Continued)

FOREIGN PATENT DOCUMENTS
EP    0 727 671 A3    3/1997
(Continued)

OTHER PUBLICATIONS
McMakin D.L., Sheen D.M., Hall T.E.; Millimeter-Wave Imaging For Concealed Weapon Detection; 2003; Proceedings of SPIE; vol. 5048; pp. 52-62.*
(Continued)

*Primary Examiner*—David P Porta
*Assistant Examiner*—David S Baker
(74) *Attorney, Agent, or Firm*—Birch, Stewart, Kolasch & Birch, LLP

(57) ABSTRACT

The terahertz camera has a fixed objective lens (2) and a plurality of detectors (3) positioned at the focal plane of the objective lens (2). Each of the detectors (3) is mounted on a movable support (10) so that the antenna is capable of movement across the focal plane of the objective lens (2) and is provided with a flexible waveguide (4) for connecting the output of the detector (3) with signal processing means. Each detector (3) is also provided with a retroreflector (6) which is reflective at frequencies other than terahertz frequencies. During use of the camera, the retroreflector (6) of each detector (3) is illuminated at non-terahertz frequencies so that the spatial position of each detector (3) and hence the spatial source of signals generated by the detector can be accurately identified. The terahertz camera is particularly suited for use in security installations and in chemical and food processing industries.

20 Claims, 2 Drawing Sheets

U.S. PATENT DOCUMENTS

| | | | | |
|---|---|---|---|---|
| 5,073,782 | A * | 12/1991 | Huguenin et al. | 342/179 |
| 5,243,282 | A * | 9/1993 | Miller et al. | 324/300 |
| 5,298,909 | A * | 3/1994 | Peters et al. | 343/720 |
| 5,438,336 | A * | 8/1995 | Lee et al. | 342/174 |
| 6,014,108 | A * | 1/2000 | Lynch et al. | 343/753 |
| 6,225,955 | B1 * | 5/2001 | Chang et al. | 343/720 |
| 6,353,224 | B1 * | 3/2002 | Sinclair et al. | 250/336.1 |
| 7,221,139 | B2 * | 5/2007 | Ammar | 324/76.14 |
| 7,239,122 | B2 * | 7/2007 | Ammar | 324/76.14 |
| 2002/0145492 | A1 | 10/2002 | Chekroun et al. | |
| 2003/0128912 | A1 | 7/2003 | Dames et al. | |
| 2006/0076493 | A1 * | 4/2006 | Bluzer | 250/338.1 |
| 2007/0001895 | A1 * | 1/2007 | Kolinko et al. | 342/22 |
| 2008/0023632 | A1 * | 1/2008 | Ridgway et al. | 250/338.1 |

FOREIGN PATENT DOCUMENTS

| | | |
|---|---|---|
| GB | 2 347 835 A | 9/2000 |
| WO | WO-93/05408 A | 3/1993 |
| WO | WO-98/43314 A1 | 10/1998 |
| WO | WO-00/50859 A1 | 8/2000 |
| WO | WO-01/50176 A1 | 7/2001 |
| WO | WO-02/09469 A2 | 1/2002 |
| WO | WO-02/17231 A | 2/2002 |
| WO | WO-02/46825 A1 | 6/2002 |
| WO | WO-03/042670 A1 | 5/2003 |

OTHER PUBLICATIONS

McMakin D.L., Sheen D.M., Hall T.E.; Millimeter-Wave Imaging For Concealed Weapon Detection; 2003; Proceedings of SPIE; vol. 5048; pp. 52-62.*

McMakin et al., Proceedings of the SPIE—The International Society for Optical Engineering SPIE-INT, Soc. Opt. Eng USA, vol. 5048, Mar. 4, 2003, pp. 52-62.

"T-ray Specs," "Radiation from a previously unexploited region of the electromagnetic spectrum could hold the key to a new generation of security devices. Catherine Zandonella investigates," Nature, vol. 424, Aug. 14, 2003, pp. 721-722.

Johnson et al., "Interferometric Imaging With Terahertz Pulses," IEEE Journal on Selected Topics in Quantum Electronics, vol. 7, No. 4, Jul./Aug. 2001, pp. 592-599.

* cited by examiner

MILLIMETRE AND SUB-MILLIMETRE IMAGING DEVICE

The present invention relates to an imaging device and particularly but not exclusively to a millimetre and sub-millimetre wavelength scanning camera capable of operating at ambient temperatures.

Sub-millimetre radiation also referred to as terahertz radiation, which lies between microwaves and infrared light, is known to be capable of penetrating through paper and clothing. This range of wavelengths has therefore been identified as a useful tool in combating the increasing threat of terrorist activities as it is can be used to locate hidden metallic and non-metallic weapons in much the same way as x-rays are currently used in airport security. Terahertz radiation is also known to be useful in astronomical studies and in spectroscopic analysis of biological matter as different biological molecules absorb different frequencies of terahertz radiation. Its ability to penetrate through the uppermost skin layers also suggests the possibility of terahertz radiation being used in the identification and analysis of skin cancers.

At the low frequency end of the terahertz spectrum, radiation can be detected using an aerial in the same way that radio waves are detected. However, even at 0.1 THz the aerial is only 1 mm in length and as the frequency increases the size of the aerial decreases. In WO98/43314 methods for fabricating millimetre and sub-millimetre horn antenna are described in which a mould for the shape of half of a horn antenna is first prepared using resist on a substrate. The resist is etched to the desired shape for the antenna and the surface of the resist mould is then metalized. Thereafter the resist is removed so that all that remains is the metal layer in the shape of half of the horn antenna. Two such metalized structures can then be connected together to form the full horn antenna. This technique enables much more complicated structures for the horn antenna to be fabricated than had formerly been the case.

The present invention seeks to provide a scanning imaging device which is particularly suited to imaging at millimetre and sub-millimetre wavelengths and is capable of providing improved resolution over existing scanning imaging systems at these wavelengths.

In accordance with a first aspect of the present invention there is provided an imaging device for generating images at a first set of wavelengths in the millimetre and sub-millimetre range, the imaging device comprising: a lens system for generating an image of a sample at a focal plane; one or more detectors, each detector comprising an antenna and associated signal processing means, each antenna being located at the focal plane of the lens system; one or more movable supports on which the one or more antennae are mounted, the supports including drive means for controllably moving the one or more antennae across the focal plane; and a reflector adapted to reflect radiation at a second set of wavelengths, different to said first set of wavelengths, mounted on each antenna.

In a preferred embodiment the antennae are in communication with said signal processing means by means of a flexible waveguide. Also, preferably the drive means comprises a piezoelectric actuator.

Additionally, preferably the imaging device includes a light source arranged to illuminate said reflectors with radiation at said second set of wavelengths and a camera for detecting light reflected from said reflectors.

In accordance with a second aspect of the present invention there is provided an imaging device for generating images at wavelengths in the millimetre and sub-millimetre range, the imaging device comprising: a lens system for generating an image of a sample at a focal plane; one or more detectors adapted to detect a plurality of wavelengths in the millimetre and sub-millimetre range, each detector comprising an antenna and associated signal processing means, each antenna being located at the focal plane of the lens system.

Embodiments of the present invention will now be described by way of example with reference to and as shown in the accompanying drawings, in which.

Figure 1:
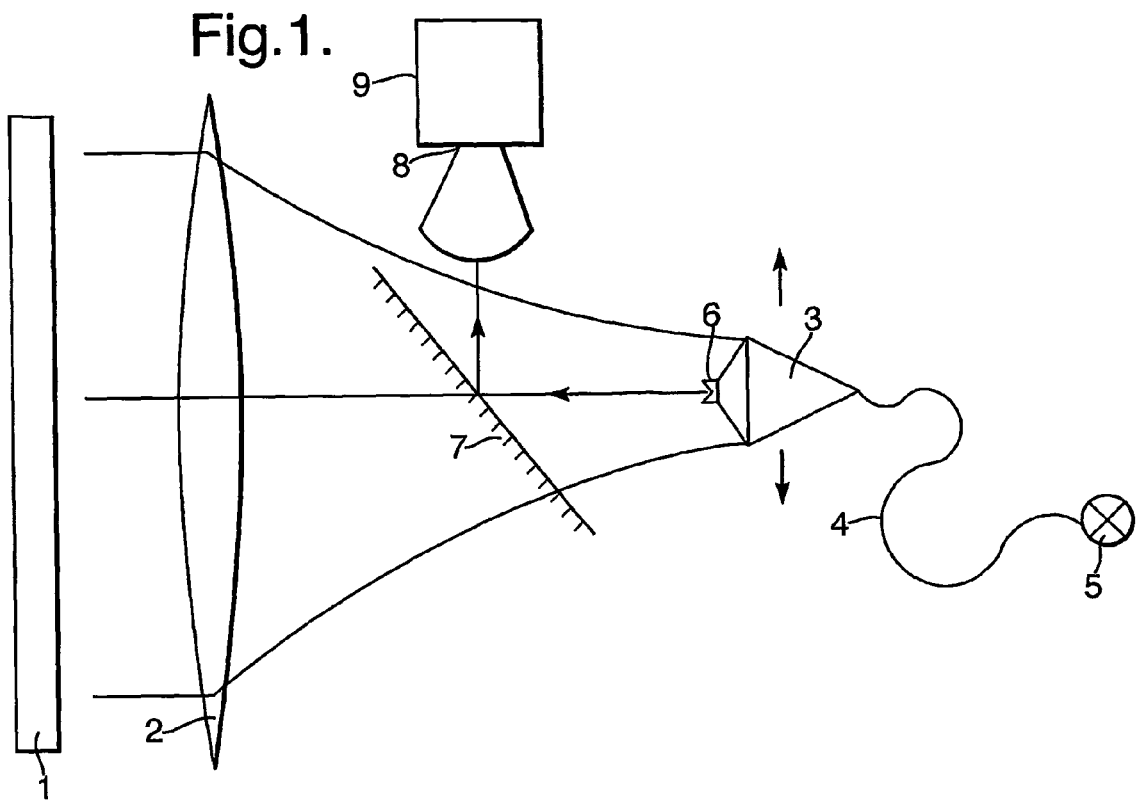
FIG. 1 is a schematic diagram of a scanning terahertz camera in accordance with the present invention.

The terahertz camera illustrated in FIG. 1 generally comprises a sample mount 1, a fixed objective lens 2 and a plurality of detectors in the form of antennae 3 (only one is illustrated in FIG. 1) located at the focal plane of the lens 2. Each one of the antennae 3 is connected via a respective waveguide 4 to a conventional mixer circuit 5 and readout electronics including but not limited to data analysis systems (not illustrated). Additionally, each antenna 3 has mounted across its aperture a retroreflector 6 which is reflective to radiation at optical wavelengths. A beamsplitter 7 is preferably mounted between the objective lens 2 and the array of antennae 3 at an angle of preferably 45° and is arranged to direct light from an optical light source 8 to the retroreflectors 6 mounted on each of the antennae. Accompanying the optical light source 8 is an optical imaging device 9 such as a CCD camera for detecting and recording light reflected from the retroreflectors 6.

The objective lens 2 is preferably an aspheric plastic lens suitable for focusing an image of a sample on the sample mount 1 onto the detectors 3 at the focal plane of the lens. For focusing images at millimetre and sub-millimetre wavelengths the diameter of the objective lens 2 will be of the order of 100 mm and the focal length of the lens will be approximately of the same order. Alternatively, the lens may be replaced with an off-axis concave mirror. Furthermore, ideally, the beamsplitter 7 is one that is substantially transparent (i.e. reflection >5% and preferably >1%) to radiation at millimetre and sub-millimetre wavelengths. The mixer 5 is preferably a heterodyne mixer and is generally conventional in design albeit at smaller dimensions than are required for radio wavelengths.

Figure 2:
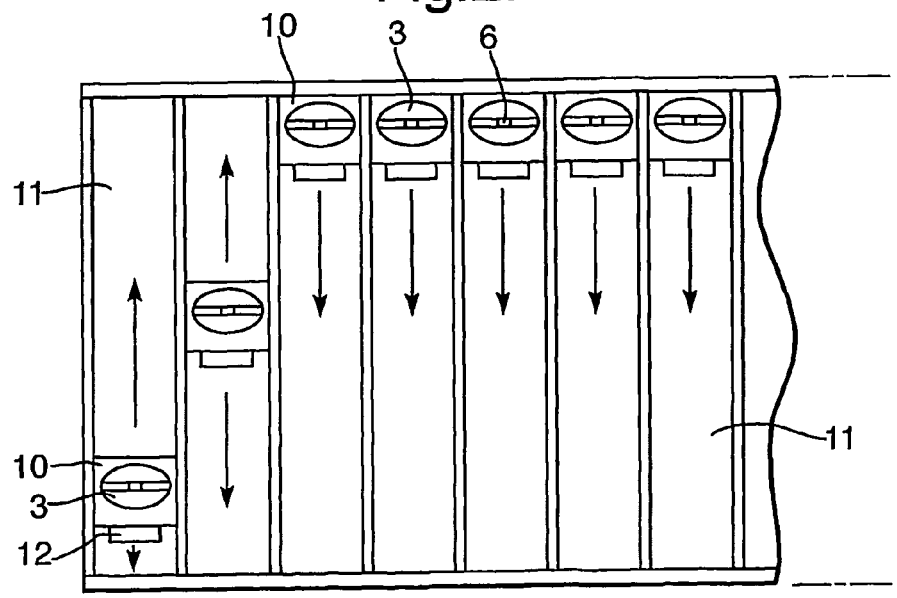
FIG. 2 illustrates the array of antennae for the camera of FIG. 1.

Each one of the antennae 3 is supported on a mount 10 that is movable across the focal plane of the objective lens 2. Preferably, as illustrated in FIG. 2, the mounts 10 of each of the antennae engage with respective linear tracks 11 that extend substantially parallel to one another across the focal plane of the objective lens 2. The mounts 10 include respective drive actuators 12, preferably a conventional piezoelectric drive, which control the motion of the mount 10 and its antenna 3 along their respective track 11. Each antenna 3 is thus capable of adopting any position along a line extending across the focal plane of the objective lens and the waveguides 4 of the antennae 3 therefore are preferably flexible, low loss, dielectric waveguides to accommodate this motion. Flexible metallic waveguides may alternatively be employed.

For imaging at millimetre and sub-millimetre wavelengths the antennae 3 are preferably in the form of a horn antenna such as but not limited to those described in WO 98/43314. The aperture of each antenna is therefore around 2 mm and so a line of 16 individual antennae would extend approximately 35 mm, allowing for a separation between adjacent antennae.

Thus, by providing each antenna with a track length of around 25 mm an effective focal plane area of 35 mm×25 mm can be scanned by the plurality of antennae 3. In order to reduce any masking of the antenna by the antenna's retroreflector 6, the retroreflector is preferably approximately only 0.2 mm in length. Where the antennae are fabricated using micromachining techniques, the retroreflectors are preferably lithographically fabricated and suspended across the antenna aperture on thin silicon strips.

Thus, the imaging device described above combines a fixed lens with a scanning array of antennae. By providing a small retroreflector on each antenna, the precise position of each antenna in the effective focal plane can be determined by imaging light reflected off the retroreflector by the CCD camera 9. This enables significantly improved image resolution and additionally can be utilised in a feedback mechanism to control further movement of the antennae.

The imaging device described above has the additional advantage of providing a digital zoom facility as it is possible to integrate over a small area of the terahertz image to achieve a higher resolution.

The imaging device described above is capable of generating images of samples from the natural terahertz radiation emitted by the sample. However, the imaging device is also suited to imaging samples illuminated by an external terahertz radiation source such as a Gunn oscillator operating at around 80 GHz in combination with a power amplifier and frequency tripler.

The antennae 3 described above are independently movable. However, in an alternative embodiment a plurality of antennae 3 may be coupled so that a single drive actuator may be used to move the plurality of antennae together. For example, the antennae 3 may be arranged in a linear array i.e. side by side, on a common mount which is then moved to scan the linear array across the focal plane of the terahertz lens. Moreover, it is not essential for the antenna mounts to be restricted to motion along tracks. The tracks may be omitted and the drive actuators for the mounts capable of driving the mounts in more than one or indeed in any direction. Also, it will of course be apparent that in a further alternative embodiment only a single antenna need be employed which is supported on a mount that has an associated drive actuator capable of controllably positioning the antenna at any desired position in the scanning area lying in the focal plane of the terahertz lens.

Although reference has been made herein to the provision of an optical beamsplitter in the path of the terahertz radiation from the lens to the antennae, it is also envisaged that the imaging device described above be operated in the absence of the optical beamsplifter. With this alternative embodiment the retroreflectors are illuminated at an acute angle with respect to the focal plane of the terahertz lens. In a further alternative embodiment the retroreflector may be replaced by an alternative optical reflector such as a plane or mirror. In the case of a plane mirror which is illuminated at an acute angle to the plane in which the antennae lie, the optical light source and the camera may be separated and arranged at opposed sides of the terahertz lens.

Furthermore, although piezoelectric drive actuators are the preferred means for controlling the movement of the antennae it will of course be apparent that alternative mechanical/electrical actuators may be implemented without departing from the invention.

The emissivity of a material, and in particular the strength of the emitted signal, is known to vary with frequency. Moreover, this variation in emissivity with frequency generally differs for different materials. Accordingly, a material may be identified by measuring the strength of the emitted radiation at different frequencies and comparing the results with those of known materials, e.g. using a look-up table.

In a further embodiment of the present invention, the mixer of the signal processing means associated with each detector is adapted to operate over a range of frequencies. For example, the local oscillation frequency of the mixer circuit may be varied such that the detector detects radiation at a plurality of different frequencies. The frequency of the local oscillator may be switched such that the detector detects different discrete frequencies. Alternatively, the local oscillator may be swept through a range of oscillation frequencies such that the detector is similarly swept through a range of detected frequencies.

For certain materials, the emissivity, transmission and reflection characteristics may vary only slightly over a particular range of sub-millimetre frequencies. In order to improve differentiation between materials, the detectors of the imaging device are preferably adapted so as to measure frequencies over at least the range 100 GHz to 1 THz. Where a broad range of frequencies is required, a single detector may not be capable of covering the desired frequency range, whether swept or switched. The imaging device therefore preferably comprises a plurality of detectors, the mixer associated with each detector being adapted to operate over a different frequency range.

The detection of a broad range of frequencies using a plurality of detectors may be achieved in a number of ways. For example, each detector may be adapted to detect a different discrete frequency or sub-range of frequencies within an overall desired frequency range. The arrangement or positioning of the individual detectors within the focal plane may be selected such that detectors for a selected frequency or sub-range of frequencies are distributed over the focal plane. Alternatively, the imaging device may comprise pixel detectors arranged in linear arrays, with each pixel detector of an array being adapted to detect a different discrete frequency or a sub-range of frequencies within the overall desired frequency range, but with pixel detectors in adjacent linear arrays being sensitive to corresponding frequencies. By employing a stack of linear arrays that may be mobile or static imaging times may be decreased. In a further alternative, all pixel detectors within a particular linear array may be adapted to detect the same frequency or sub-range of frequencies, but with detectors in adjacent arrays adapted to detect a different frequency or sub-range of frequencies. Thus with this alternative embodiment, by stacking the linear arrays the overall desired frequency range can be covered.

By detecting radiation at different frequencies and comparing the variation in signal strength with that of known materials (e.g. using a look-up table), the imaging device of the present invention can be used to identify the presence of particular materials. For example, the imaging device may be used in the food industry where it can be used to monitor the condition of foods and hygiene standards. The imaging device is particularly suited for use in security systems to identify contraband materials, such as plastic explosives, that would not normally be visible using conventional screening methods. The data analysis element of the imaging device may be programmed to flag only particular materials, with the location of the flagged material being identified on an image generated by the device in a highly visibly manner. Additionally, the detection of a flagged material may trigger some form of alarm.

Where the imaging device is used to identify the presence of a selected material, image resolution may be less important than material selectivity and imaging speed. In particular, it may be more important to know that a particular material is present than where exactly the material is located. Accordingly, image resolution may be sacrificed at the expense of material selectivity and speed, i.e. ensuring that the detectors cover a suitable number and range of frequencies and that the image can be formed/collected within a reasonable time frame.

The imaging device of the present invention, like any other camera, is capable only of imaging those surfaces of the subject facing the imaging device. The imaging device is not therefore capable of imaging those surfaces of the subject facing away from the detectors. In order to collect illumination from both faces of the subject, the imaging device may be used in conjunction with a mirror positioned behind the subject, which is reflective to terahertz frequencies. Additional mirrors may also be positioned above and/or below the subject.

Figure 3:
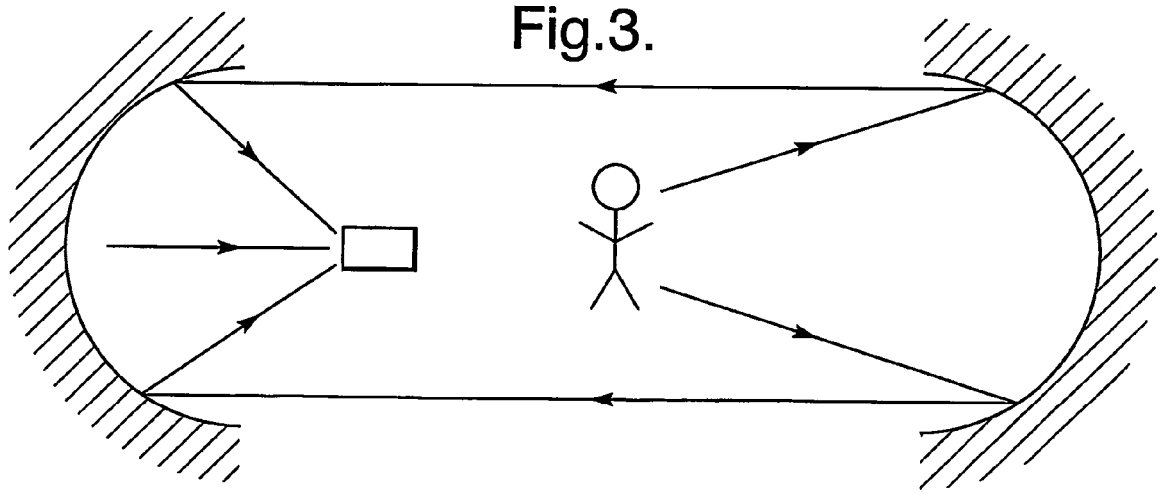
FIG. 3 illustrates an imaging device in accordance with the present invention in use with mirror optics to increase the collection of available illumination.

As the wavelength of terahertz radiation (typically 1 mm or less) does not require exacting standards of metal finishing, the mirror may be made using conventional machined metals, such as aluminium. One or more conventional planar mirrors angled towards the imaging device may be used. However, as illustrated in FIG. 3, concave mirror optics with point-to-parallel imaging is preferred owing to the possibility of collecting all terahertz illumination; this is particularly important where one wishes to collect all possible illumination from small samples. Alternatively, aspheric optics may be employed. Moreover, additional optics and/or cameras may be employed so as to avoid shadowing by the subject.

The size of the mirrors will depend upon the size of the subject to be imaged and consequently relatively large mirrors may be required for a large subject, such as a heavy-goods vehicle. In these circumstances, the mirrors may be constructed from a moulded plastic body coated with an appropriate metal reflector.

As already noted above, there are circumstances, such as in the detection of contraband materials, where it is more important to detect the presence of an object (such as a lump of plastic explosive) than to actually image the object. The use of mirrors in conjunction with the imaging device permits the collection of as much illumination as possible at different frequencies. Consequently, the present invention is ideally suited to screening subjects for the presence of contraband materials.

It is anticipated that the present invention will have particular applications in airport and seaport security, where the mirrors and/or camera may be concealed from the subject behind panels of material transparent to Terahertz frequencies, e.g. paper poster displays, cardboard or plastic sheeting.

Further changes to the specific embodiments of the invention described above are envisaged such as omission of the sample mount and mounting the mixer with the antenna so that both are mounted for movement across the focal plane of the lens without departing from the scope of the invention as defined in the accompanying claims.

The invention claimed is:

1. An imaging device for generating images at a first set of wavelengths in the millimetre and sub-millimetre range, the imaging device comprising: a lens system for generating an image of a sample at a focal plane; one or more detectors, each detector comprising an antenna and associated signal processing means, each antenna being located at the focal plane of the lens system; one or more movable supports on which the one or more antennae are mounted, the supports including drive means for controllably moving the one or more antennae across the focal plane; and a reflector adapted to reflect radiation at a second set of wavelengths, different to said first set of wavelengths, mounted on each antenna.

2. The imaging device of claim 1, wherein the one or more detectors are adapted to detect a plurality of wavelengths in the millimetre and sub-millimetre range.

3. The imaging device as claimed in claim 2, wherein the imaging device comprises a plurality of detectors and the antennae are arranged as a linear array.

4. The imaging device as claimed in claim 3, wherein the antennae are arranged as a stack of linear arrays.

5. The imaging device of claim 2, further comprising a data analysis element arranged to compare variation in signal strength of the detected wavelengths with variations for selected materials to identify the presence of said selected materials in the sample.

6. The imaging device of claim 5, wherein the data analysis element is programmed to flag the location of said identified selected materials on an image generated by the device.

7. The imaging device as claimed in claim 2, wherein each detector is adapted to detect a range of wavelengths.

8. The imaging device as claimed in claim 2, wherein each detector is adapted to detect a single wavelength and the imaging device comprises at least two detectors adapted to detect different wavelengths.

9. The imaging device as claimed in claim 2, wherein the detectors are adapted to detect frequencies in the range 100 GHz to 1 THz.

10. The imaging device as claimed in claim 2, wherein each detector is adapted to detect a different frequency or range of frequencies.

11. The imaging device as claimed in claim 2, wherein the antennae are positioned within the focal plane such that detectors adapted to detect a selected frequency or range of frequencies are distributed over the focal plane.

12. The imaging device of claim 2, wherein the imaging device comprises a table of variations in signal strength of said selected materials.

13. An imaging device as claimed in claim 1, further comprising a light source arranged to illuminate said reflectors with radiation at said second set of wavelengths.

14. An imaging device as claimed in claim 13, further comprising a camera for detecting light reflected from said reflectors.

15. An imaging device as claimed in claim 13, further comprising a beamsplitter positioned to direct light from said light source to said reflectors and from said reflectors to said camera.

16. An imaging device as claimed in claim 1, wherein said antennae are in communication with said signal processing means by means of a flexible waveguide.

17. An imaging device as claimed in claim 1, wherein said drive means comprises a piezoelectric actuator.

18. An imaging device as claimed in claim 1, wherein said drive means are adapted to move said mount in three or more different directions.

19. An imaging device as claimed in claim 1, further comprising a sample stage on which the sample to be imaged is mounted in fixed relationship with the lens system.

20. An imaging system as claimed in claim 1, further comprising a radiation source arrange to illuminate said sample with said first set of wavelengths.

* * * * *